(12) United States Patent
Goldberg

(10) Patent No.: US 7,209,600 B2
(45) Date of Patent: Apr. 24, 2007

(54) SYNCHRONIZATION OF COMPONENTS FOR PRINTING

(75) Inventor: Stephen F. Goldberg, Dayton, OH (US)

(73) Assignee: Eastman Kodak Company, Rochester, NY (US)

( * ) Notice: Subject to any disclaimer, the term of this patent is extended or adjusted under 35 U.S.C. 154(b) by 700 days.

(21) Appl. No.: 10/178,872

(22) Filed: Jun. 24, 2002

(65) Prior Publication Data
US 2003/0234959 A1 Dec. 25, 2003

(51) Int. Cl.
G06K 9/32 (2006.01)
G06K 9/00 (2006.01)
G06K 9/36 (2006.01)

(52) U.S. Cl. .................. 382/294; 382/112; 382/151

(58) Field of Classification Search ............ 382/103, 382/112, 141, 151, 287, 294
See application file for complete search history.

(56) References Cited

U.S. PATENT DOCUMENTS 4,165,465 A * 8/1979 Kanatani et al. ....... 250/559.44
6,126,341 A * 10/2000 Tanaka et al. ............ 400/74
6,164,847 A * 12/2000 Allen ...................... 400/74
6,219,517 B1 * 4/2001 Takahashi et al. ......... 399/301
6,657,740 B1 * 12/2003 Emminizer ................ 358/1.14

* cited by examiner

Primary Examiner—Jingge Wu
Assistant Examiner—Wes Tucker

(57) ABSTRACT

The present invention relates to a technique for detecting that all components that make up a completed portion of a form are synchronized. A method is provided for detecting that for a print job, all of the components that make up a completed portion of each form are printed in synchronicity or in the case of an error in synchronicity, an error condition is asserted. The print job comprises at least one form, and each form may contain more than one image, each image may contains one or more image planes and the images on each form of a document may vary. Each image contains a composite image group (CIG) mark comprising the set of image plane coordination (IPC) marks associated with each individual image plane. An IPC mark is printed by each print engine such that it is possible via inspection of these marks to determine if the complete set of image planes that make up a specific image are present. The present invention allows one to confirm, using the CIG marks, that all forms in a print job are synchronized.

29 Claims, 4 Drawing Sheets

Representation showing multiple planes making an image – all in proper location

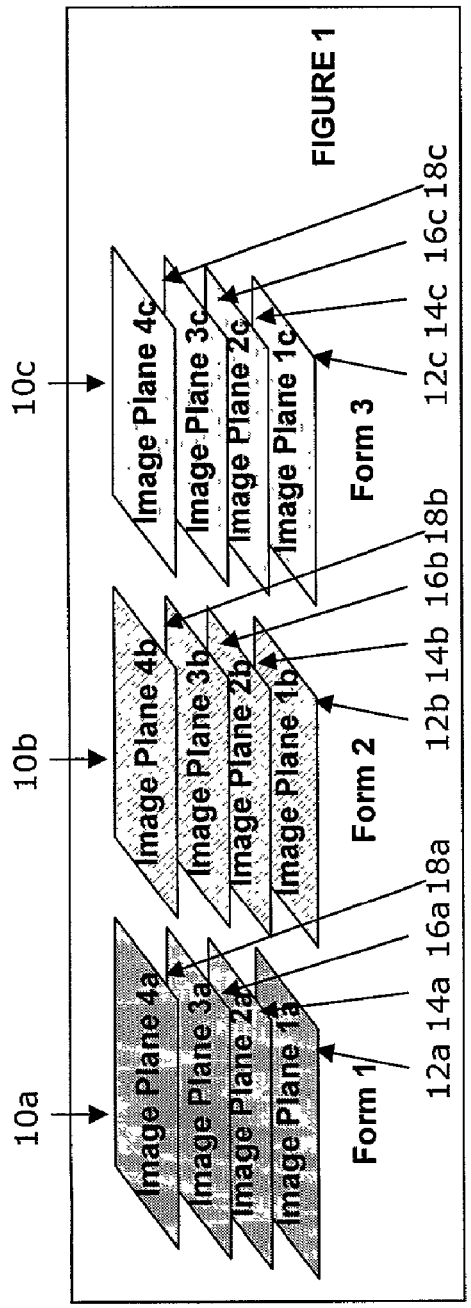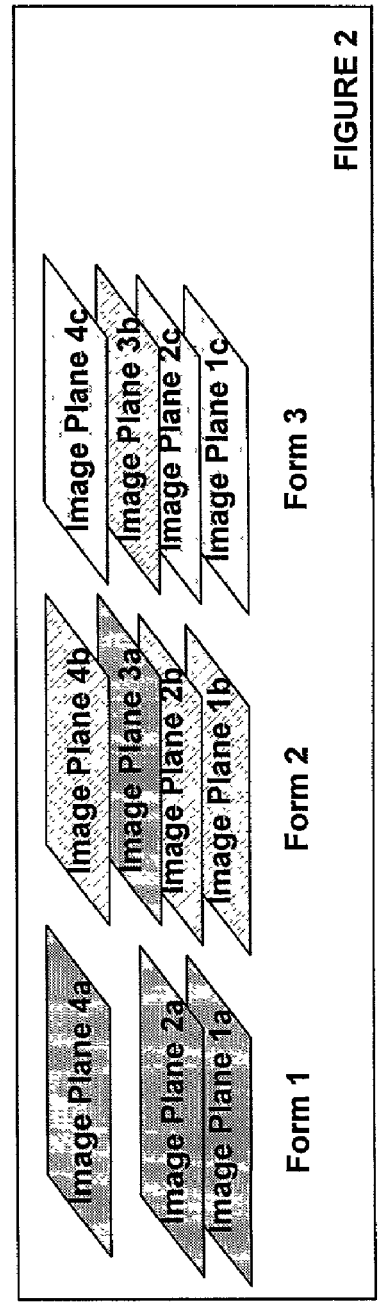

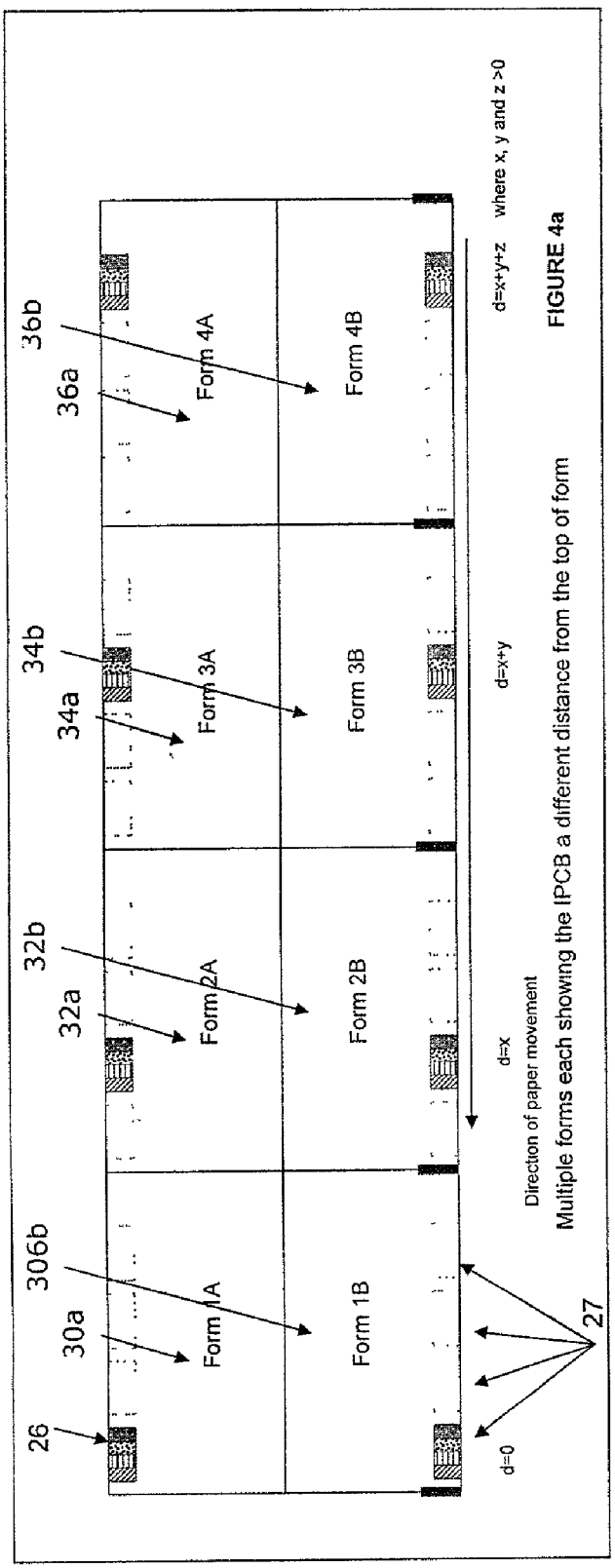
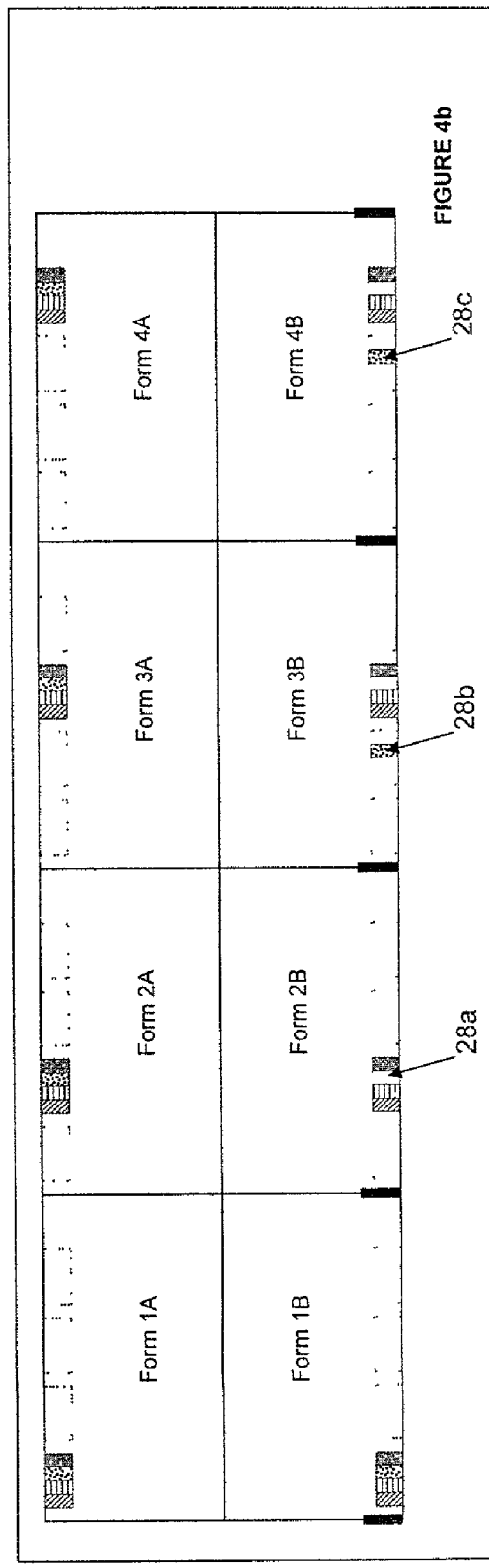

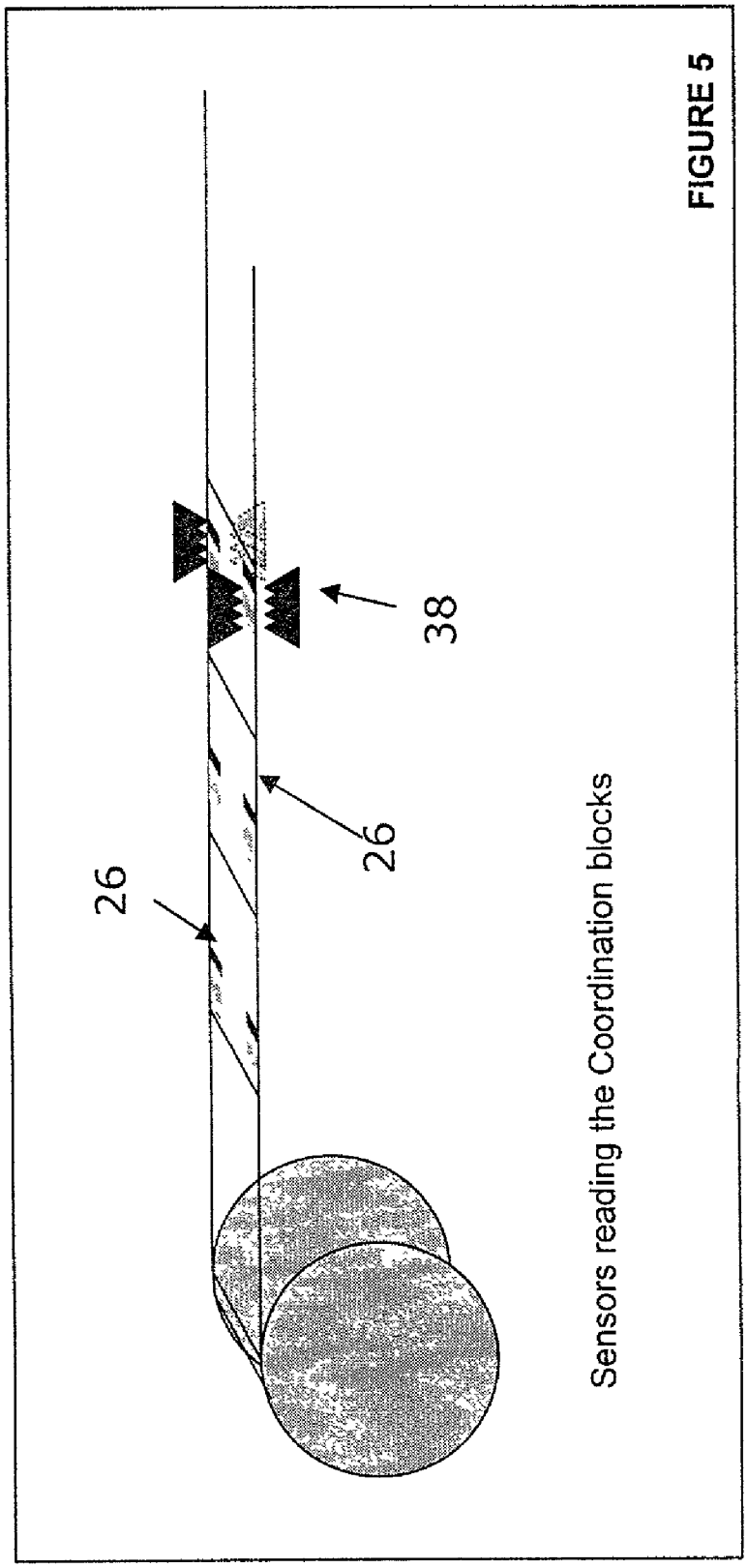

SYNCHRONIZATION OF COMPONENTS FOR PRINTING

TECHNICAL FIELD

The present invention relates to digital printing systems and, more particularly, to a technique for detecting that all components that make up a completed portion of a form are synchronized.

BACKGROUND ART

In a digital printing system a document may be made up of multiple forms, each form may be made up of multiple images, and each image may be made up of multiple image planes. Although these terms are commonly used in the printing industry, the meaning of these terms is not precise and tends to vary. As used herein, a form refers to the contents of a physical portion of a printed media such as a page. A form may have one or two sides. A form origin is a position at the top of the form, while a cue mark is a physical mark or a logical position for pin-feed cueing, identifying the form origin. A document can be defined as a series of forms that are logically associated, such as a book or a multi-page billing statement. A print job can be defined as a series of documents. In some cases, a document may consist of multiple forms where the forms are printed 2-up across a web of paper. The information printed on one side of a form is an image, while an image plane is a "layer" of an image printed by a single print engine. For example, in a processed color job, each of the CYMK colors is printed by a single print engine in a separate image plane. A print engine is a marking device such as a printhead that prints one image plane, or a portion of one image plane. In an Advanced Function Printing/Intelligent Printing Data Stream (AFP/IPDS) environment, each of the Object Content Architecture (OCA) colors is in a separate image plane. An Image Plane Coordination (IPC) Mark refers to a mark associated with the image plane. A Composite Image Group (CIG) Mark is a set of IPC marks consisting of one IPC mark for each image plane in a form.

In some systems, the form width may be larger than the print engine print area and multiple print engines may be stitched together side by side to construct a complete form. A very simple document can be described as consisting of multiple sequential forms, each with a single image plane, printed on only one side of the form. Since such a document is generally printed using a single print engine, synchronization is not an issue in that case. However, many documents are more complicated and require multiple print engines to create each form. Common examples of this are two sided (duplexed forms), forms printed in multiple colors, or forms made up of multiple stitched print engines. It is possible for the print engines to get out of synchronization with each other, or for the data sent to any of the print engines to get out of synchronization, such that images or portions of images are no longer properly synchronized to the proper form. The consequence of incorrect synchronization is generally very significant and measures used to detect the condition are necessary.

Various methods exist for detecting and addressing synchronization. For example, some printing systems print bar codes or other marks containing data on each side of a form, and after the form has been printed, read the codes or marks to insure they are properly synchronized. Existing methods for detecting synchronization require the printing of specialized marks, a reader or a scanner to read the marks, and software to interpret the marks and validate the results. While this system may be suitable for monochrome applications, it becomes very cumbersome for applications where a large number of print engines may be used. i.e. 2-up duplex, four color print job.

It is seen then that there exists a need for an improved means for detecting synchronization, particularly for printing of multi-color applications.

SUMMARY OF THE INVENTION

This need is met by the synchronization system and method according to the present invention, wherein proper synchronization of information of a portion of a media is detectable. The present invention detects if all of the image planes that make up an image are properly coordinated and printed on the same form. The present invention further detects any errors in synchronization of images on both the front and the back side of a form. The present invention further detects any errors in synchronization of images where the image planes of an image are printed using stitched print engines.

In accordance with one aspect of the present invention, a method is provided for detecting that for a print job, all of the components that make up a completed portion of each form are printed in synchronicity or in the case of insynchronicity, an error condition is asserted. The print job comprises at least one form, and each form may contain more than one image, each image may contains one or more image planes and the images on each form of a document may vary.

According to the present invention, each image contains a Composite Image Group (CIG) mark comprising the set of Image Plane Coordination (IPC) marks associated with each individual image plane. An IPC mark is printed by each print engine such that it is possible via inspection of these marks to determine if the complete set of image planes that make up a specific image are present. The IPC marks for each image plane are located within the image such that such that they do not overlap, and they are positioned relative to each other in a fixed and known manner such that their relative positions can be later detected by sensors. The relative positions for the IPC marks are referenced to the origin of the CIG mark. Detection of the proper relationship of a set of IPC marks defines a valid CIG mark and hence, a completed image. In order to determine the synchronicity of the image, however, the present invention provides additional information that needs to be generated and detected.

The set of images that make up a specific form has the origin of the CIG mark for each image located the same distance from the form origin. For sequential forms, the distance of the CIG mark from the form origin varies. After all of the images on a specific form have been printed, the CIG mark(s) associated with that form, is read with sensors that determine if all of the IPC marks are valid and offset the same distance from the form origin. If the distance from the form origin for all of the IPC marks on a form are the same, the CIG mark(s) is valid, and a condition is created indicating a Valid Form. The lack of a Valid Form condition is used by the printing system to indicate that the information on the form is not properly coordinated.

Accordingly, it is an object of the present invention to provide a means for detecting errors in synchronization of all image planes of all images of all forms in a print job. Other objects and advantages of the invention will be apparent from the following description, the accompanying drawings and the appended claims.

BRIEF DESCRIPTION OF THE DRAWINGS

FIG. 1 shows a series of successive forms, each comprised of images with multiple image planes;

FIG. 2 illustrates an error condition where a successive image, as shown in FIG. 1, has been displaced from its proper location;

FIGS. 4a and 4b show multiple forms illustrating the synchronization detection technique of the present invention; and FIG. 5 illustrates coordination marks printed successively and being read by sensors during printing.

DETAILED DESCRIPTION OF THE PREFERRED EMBODIMENTS

Figure 3:
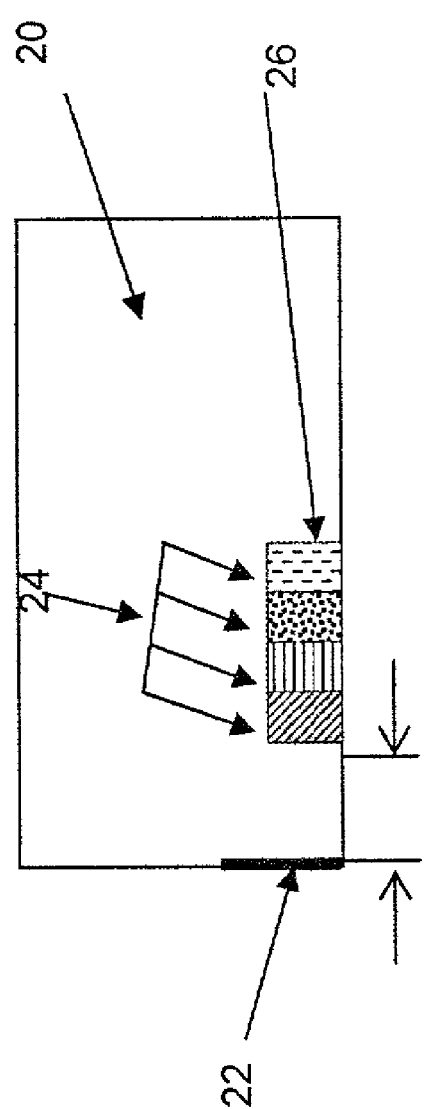
FIG. 3 illustrates a form implementing the synchronization detection technique of the present invention, by incorporating coordination marks thereon.

The present invention detects if all of the information printed on a form, is properly synchronized. The synchronization is detectable on both the front and back sides of the media. Although the synchronization detection proposed by the present invention is particularly suitable for 1-up or 2-up documents, simplex or duplex, it may be extended to any layout of information. Furthermore, although the description of the invention refers to a digital ink jet printing system containing more than one print engine, it should be obvious to anyone who understands digital printers that the problem described and the method for detecting the problem is just as applicable to any digital printing system with more than one print engine.

Referring now to FIG. 1, there is illustrated a series of successive forms 10a, 10b and 10c. Each exemplary form is comprised of one image each with four image planes, 12a, 12b, 12c, 12d, 14a, 14b, 14c, 14d, 16a, 16b, 16c, 16d, 18a, 18b, 18c, 18d. By way of example, these image planes might correspond to cyan, magenta, yellow, and black portions of the image. An alternative example is a system where one print engine prints the left side of the form, a second print engine prints the right side of the form, and two more print engines are used to print the back side of the form. When printing, it is necessary for the multiple image planes to be properly synchronized so that the resultant composite images consist of the intended image planes. If one or more of the print engines get out of synchronization with the others, or if the data sent to the print engines gets out of synchronization, images, or portions of images in the case of stitched print engines, are no longer properly synchronized. The consequence of incorrect synchronization is generally very significant in that the resultant form will contain incorrect data.

By way of example, FIG. 2 shows such a condition where the third image plane represented by 16a, 16b, and 16c has "slipped". Hence, form 10a is missing an image plane 16a, and forms 10b and 10c each have the third image plane 16a and 16b, respectively, from the previous form on them. This results in an error condition where the images on each form are now made up of improper image planes. In conventional printing, where each document is the same as the preceding one, such a slippage is of little consequence. However, when variable data is printed, such a slippage can be quite significant. For example, if the documents being printed were financial statements such a slippage might result in one of the image planes, containing part of the financial records being print on a subsequent document that would be mailed to another individual. While this slippage error might be immediately detected by the person receiving the printed statement, it might be very difficult for the operator of the printing system to detect. Furthermore, such a slippage would typically not involve a single document, but rather a large print job.

Referring now to FIG. 3, the present invention proposes placing coordination marks on each form 20, such that it is possible to tell if all of the components that make up that form are properly coordinated in relationship to each other. In accordance with the present invention, each image plane of each image of a form 20 contains an Image Plane Coordination (IPC) Mark 24, printed by the same print engine used to print that image plane. In FIG. 3, the image plane coordination marks are shown as rectangles filled with a different pattern for each image plane. This is so they can be distinguished from each other in this document. In actual practice, as will be understood by those skilled in the art, the image plane coordination marks can be any shape, and can be completely or partially filled in, so long as they can be recognized as present or as not present. In a preferred implementation, the Image Plane Coordination Marks 24 are solid rectangles and can be approximately ¼" square, or smaller. For each image on a form, there is a set of Image Plane Coordination Marks for all of the image planes that constitute the image. The resultant set defines a Composite Image Group (CIG) Mark. The makeup of a CIG mark is such that its marks are positioned having a known offset or relative placement from one another. The placement of the IPC marks may be accomplished either in the data preparation, or added to the data by the Raster Image Processors (RIPS).

FIGS. 4a and 4b illustrate multiple forms 30a, 30b, 32a, 32b, 34a, 34b, 36a, 36b, each having a CIG mark 26 associated therewith. In order to insure that images or portions of an image from one form do not get out of sync and print on another form, as was the exemplary case in FIG. 2, a differentiation is made between forms. For example, the position of the CIG mark can vary from form to form. Such a method requires that the CIG mark for consecutive images be displaced from the form origin 22 (shown in FIG. 3), or the cue mark, by different distances. In FIG. 4a, each CIG mark 26 is a different distance d from the top of the form. The distance of the CIG mark 26 from the top of forms 36a and 36b is zero; while for forms 34a and 34b, the distance is x; and for forms 32a and 32b, the distance is x+y; and finally for forms 30a and 30b, the distance is x+y+z, where x, y and z are always greater than zero and each is also greater than the width of an individual IPC mark. In FIG. 4a, then, the distance d for the first form is at one origin, and this distance d varies in a cyclical pattern with the CIG mark moving further away from origin for consecutive documents and then resetting to an origin position. In the basic implementation of FIG. 4a, four fixed positions for the start of the CIG 26 are chosen and are marked as locations 27. The start of each CIG mark position is a distance that is at least the size of a IPC mark further away from the origin than the previous CIG mark. While the CIG mark is shifted relative to the origin by different amounts from form to form, the relative placement of the individual IPC marks that make up the CIG mark always remain the same.

As long as the image planes that make up the form are properly synchronized, the IPC marks making up the CIG will have the proper relative placement to the other IPC marks. If however, one of the image planes were to become improperly synchronized, the relative placement the IPC mark associated with that image plane to the IPC marks of the other image planes would be incorrect. By way of example, we will consider a system where the CIG marks are shifted through four different positions relative to the origin. The CIG for form 1 is located at the origin, for form 2 it is shifted to 2 inches from the origin, for form 3 is shifted 4 inches from the origin, for form 4 the CIG marks is shifted 6 inches from the origin. This pattern is repeated so that on form 5, the CIG mark is again at the origin. In FIG. 4a, all the CIG marks are complete, with all the IPC marks properly placed relative to each other. This indicates that they are properly synchronized.

FIG. 4b illustrates a case where one of the image planes has gone out of synchronization. The image planes for the upper row of forms have remained synchronized, so their CIG marks are complete, with all the IPC marks properly placed relative to each other. While Form 1B is correct, in Form 2B, a synchronization error has occurred. The image plane that corresponds to the third IPC mark 28a in the CIG block failed to print. Instead that image plane was delayed by one form and was printed as part of Form 3B. Its IPC mark, that if properly synchronized to the other image planes should have been printed at location 28a, is now printed at 28b. Similarly, the image plane corresponding to the third IPC mark of Form 3B is now printed as part of Form 4B with its IPC mark therefore not being printed in the proper spatial relationship with the other IPC marks.

By detecting that the third IPC mark is not properly located relative to the other IPC marks, one can readily detect that the corresponding image plane has been improperly shifted. Such detection might be done visually by the system operator, or by electronic sensor means that will be described later.

While this example shows that shift of the image plane corresponding to the third IPC mark can be detected, it will be obvious to those skilled in the art that shifts of any of the image planes can be detected. Shifts by more than one form can also be detected. In this example, the CIG was stepped in uniform amounts from form to form. However, non-uniform steps can be employed. The example herein also had the CIG mark cyclically through four positions, relative to the origin. More generally, however, other cycle lengths can be used. Still more generally, the CIG mark can be located at random distances from the origin.

In the example shown above, by noting the shift in the placement of the third IPC mark with respect to the other IPC marks, one could determine that the image plane corresponding to the third IPC mark lagged the other image planes by one form. In general, embodiments where the CIG marks are shifted in a consistent manner from form to form allow one to identify not only which image plane is shifted, but also by how much. With this identified, corrective actions can be taken to shift the errant image plane back into proper synchronization. For the error shown in FIG. 4b, it would be necessary to shift the image plane corresponding to the third IPC mark forward by one form. The image planes would then be properly synchronized. In this manner, the present invention provides means to identify synchronization errors and means to re-synchronize the image planes.

Detection of the synchronization errors in particular forms also makes it possible to mark or label those forms, either by means of a mark printed onto the defective forms or by computer tracking, so that during subsequent processing of the print job, such as during insertion into the envelopes, these defective forms can be disposed of. In one preferred embodiment, at the stage that the defective forms are culled out, these particular forms are identified, by means of a form distinguishing bar code printed by one of the image planes. The defective forms can then be reprinted. The combination of a bar code identifying each document and the CIG marks to confirm that all image planes of each document are properly synchronized, can be used to provide the print customer with confirmation that their print job has been properly printed in its entirety.

It is sometimes desirable to determine not only that a form is properly synchronized with all of its parts, but also that it is in the proper sequence of images for a document. Conventional means such as printing sequence numbers or bar codes or other marks that represent the actual sequencing of a document, such as an account number or other customer or client identification symbol, are common. With the present invention, this sequence number needs to be printed on only one of the image planes. Hence, if upon examination, the sequence of the single image plane is determined to be correct, and using the teachings of the present invention, all of the image planes can be determined to be synchronized, then all of the image planes will be known to be in the proper sequence.

Unfortunately, with a cyclically repeating placement of the CIG marks from form to form is that if an image plane is shifted by an amount equal to the repeat length of the CIG marks, the error can't be detected. For our example system described above, if the cyan image plane where to lead the other image planes by four forms, form 5 of the cyan image plane would be printed along with the form 1 of the other image planes. As the CIG marks for both of these forms are located at the origin, one can't detect the synchronizing error. In an alternative embodiment, the CIG marks are offset by a random, or a non-repeating distance, such that two consecutive CIG marks are guaranteed never to be at the same offset distance. In this way, synchronization errors of any image plane slippage amount can be detected, at least within a few forms. This embodiment may be advantageous in a case where a set of forms repeats, and an error occurs in coordination that matches the repeat.

It should be noted that synchronization errors can be detected using the present invention if the CIG marks are only printed on alternately printed forms. For example, if the CIG marks are only printed on the odd number forms such as forms 1 and 3 of FIG. 4a, a slippage of one of the image planes by one form will result in printing an IPC mark on an even number form such as forms 2 and 4 where none were to be printed. Detection of the error can therefore be made as well. Further, it would be obvious to add the IPC marks only to selected forms in a document to check the synchronicity of the forms that make up the document only once per document. Further, it would be obvious to add IPC marks only to selected forms between documents to check the synchronicity of the forms that make up the document only once per document but to not print the IPC marks on the document itself. For example the IPC marks could be printed on separator pages between documents.

As illustrated in FIG. 5, a sensor is used to detect that all of the IPC marks that make up a single CIG mark are present by looking for completeness of the CIG mark indicators 26. Completeness is indicated when all of the IPC marks 24 for the image are in the right relationship to each other at the time of inspection. The CIG mark indicators 26 may be sensed either be a single sensor 38 or multiple sensors 38. The sensor or sensors look for the IPC marks to be present at the known offset relationship to each other. When the proper spatial relation of the IPC marks is detected, a signal or condition indicating a complete, synchronized image can be asserted indicating a good CIG (Composite Image Group) condition. Due to the common spatial relationships of the components of the CIG mark from the origin of the form, the inspection of a form does not need to be done at any specific time or position of the form. The simple condition of coincidence of all of the IPC marks by itself indicated a good form.

It is an advantage of the present invention that the synchronization detection can be applied to both the front and rear sides of a printed media, by printing the IPC marks 24 on each side of the media. A condition where the CIG condition exists simultaneously for both sides of a form indicates a Complete Form condition. It is a further advantage of this invention that synchronization of 2-up (or "n" up) documents where multiple forms are printed across the web can be verified with respect to each other and checked to insure that all of the image planes for each form have their CIG marks located in the exact same position across the web and/or on both sides of the web relative to the origin. For example, in FIG. 4a, forms 30a and 30b have their CIG marks located identically to each other; and this is the case for forms 32a and 32b, forms 34a and 34b, and forms 36a and 36b.

In the embodiment of the invention described above, the IPC marks were located relative to each other according to a predefined, readily detected spatial relationship. The collection of IPC marks, that is the CIG mark, for each form was shifted from form to form relative to the origin to differentiate the marks of one form from those of other forms. The differentiation of the composite image group marks on one form from the composite image group marks on at least one other form, is such that the readily detectable relationship between image plane coordination marks that make up each composite image group mark is intact if the image planes are properly synchronized, but broken if the image planes are not properly synchronized. The means for differentiating can be applied such that composite image group marks on a first form can be differentiated from composite image group marks on each of two or more forms printed immediately subsequent to or preceding the first form.

In accordance with the present invention, the IPC marks may comprise shapes, letters, numbers, or other marks. The IPC marks for the different image planes have a predetermined, readily detectable relationship with the other IPC marks of the composite image. While the preceding embodiment utilized a particular predefined, readily detectable spatial relationship between the IPC marks, many other predefined, readily detectable relationships are possible. One such relationship is that the shapes, letters or numbers match. The CIG marks are differentiated from form to form by changing the shape, letter or number being used from form to form. In this way, the predetermined, readily detected shape relationship between the IPC marks on a form is intact if the image planes are properly synchronized, but broken if the image planes are not properly synchronized.

In one preferred embodiment separate sensors are used for each IPC mark that make up the CIG mark. The CIG mark sensors are located adjacent to the paper path downstream of where all of the images of a form have been printed and all forms across the web have been printed. In accordance with one embodiment of the present invention, these sensors are positioned such that the relative placement of the sensors matches the desired relative placement of the IPC marks. As a properly synchronized set of forms crosses the sensors, the matched relative placement of the sensors and the IPC marks will result in the IPC marks being detecting concurrently by their corresponding sensors. This condition creates a Forms In Sync, or FIS, condition. The FIS condition is latched and held until the next top of a form reaches the sensors. Alternatively, the CIG marks may be oriented in other positions, so long as the CIG mark condition can be determined. A set of physical sensors can be mounted over the paper path with the same offsets as the individual IPC marks and as the IPC marks pass under the sensors and are detected, a condition of simultaneous detection can be made. The simultaneous detection of all of the IPC marks indicates a good CIG mark and, hence, is an indication that the image is complete. It will be obvious to those skilled in the art that the physical relationship of the sensors to each other provides one method of determining the spatial relationship. However, the sensors can actually be at any location suitable for sensing the IPC marks, and the relationship can be interpolated via software or electronics.

In accordance with the present invention, printing is controlled by a print controller that manages the print information. As the job prints, the controller tracks the location of the first form along the print path. The controller tracks or senses when the top of each form reaches the CIG mark sensors. The sensors sense the position of the CIG mark and the FIS signal is reset. If this is the first form it, discards the FIS value. As the form progresses, each of the CIG mark sensors look for the document complete signal. The output from the multiple CIG sensors is ANDed together such that a Form In Sync condition is generated. When the top of the next form is reached, the controller expects to see the Form In Sync condition. If the controller does not see this condition, an out-of-sync condition exists and the controller can take appropriate action to notify an operator or halt production of the job.

In another preferred embodiment, a single sensor is employed. The detector senses light reflected from the paper. A mask is placed between the paper and the sensor. The pattern of openings in the mask is made to coincide with the normal pattern of IPC marks. When an IPC mark is aligned with one of the opening in the mask, it reduces the amount of the light detected by the sensor. If IPC marks are aligned with each of the openings in the mask, which would indicate that the IPC marks have the proper relative placement of a properly synchronized form, the light detected by the sensor is reduced to a minimum level. A threshold detection circuit applied to the sensor output can then be used to determine whether the detected light intensity has reached the proper minimum level indicative of a properly synchronized form.

Having described the invention in detail and by reference to the preferred embodiment thereof, it will be apparent that other modifications and variations are possible without departing from the scope of the invention defined in the appended claims.

What is claimed is:

1. A method for detecting synchronization of all image planes that make up a completed form for a print job on a printer, the printer capable of printing on a print media with an associated print engines, the print job including a plurality of forms, each form having a form origin and each form containing a plurality of image planes, where the image planes that constitute an image are referred to as a composite image, and wherein each composite image can vary from form to form, the method comprising the steps of:

applying at least one image plane coordination mark to each of the plurality of image planes that comprise the composite image on each form, the at least one image plane coordination mark for each image plane resulting in a plurality of image coordination marks, each of the plurality of image coordination marks being located at defined positions relative to the image plane coordination marks for the other image planes of the corresponding image in the composite image;

forming a composite image group mark with the plurality of image coordination marks, the composite image group mark including an origin defined as a leading edge of a first of the plurality of image plane coordination marks being offset a known distance, definable as an offset distance, from the form origin;

changing the offset distance from the form origin for each composite image group mark associated with subsequent forms such that an image plane synchronization error will cause relative placement of at least one of the plurality of image plane coordination marks to deviate from its defined placement relative to any other of the plurality of image plane coordination marks;

detecting that the plurality of image coordination marks of the composite image group mark of at least one form are in a proper spatial relationship relative to each other by detecting the absence of an image plane coordination mark from the composite image group mark on the at least one form or by detecting the presence of an image plane coordination mark from the composite image group mark from another form on the at least one form; and identifying proper synchronization if all of the plurality of image coordination marks associated with the form are in a proper spatial relationship to each other, or identifying a synchronization error if at least one of the plurality of image coordination marks associated with the form is not in proper spatial relationship with the other image coordination marks associated with the form.

2. A method as claimed in claim 1 wherein the offset distance employed from one form to the next is a defined, repeated pattern.

3. A method as claimed in claim 2 wherein magnitude of an image plane synchronization error can be identified by a deviation in the relative placements of the plurality of image coordination marks.

4. A method as claimed in claim 1 wherein the offset distance employed from one form to the next is changed by a random amount.

5. A method as claimed in claim 1 wherein the at least one image plane coordination mark comprises at least one images plane coordination mark associated with each form of a print job.

6. A method as claimed in claim 1 wherein the step of detecting the placement of the image plane coordination marks relative to each other comprises the step of providing at least one electronic sensor for detection the image plane coordination marks.

7. A method as claimed in claim 1 wherein the step of detecting comprises the step of placing a plurality of electronic sensors in a same spatial relationship to each other as the image coordination marks are to each other, such that concurrent detection of the image coordination marks by each of the plurality of electronic sensors indicates a proper spatial relationship between the image coordination marks.

8. A method as claimed in claim 1 wherein the step of detecting the placement of the image plane coordination marks relative to each other comprises the step of using human observation input.

9. A method as claimed in claim 1 wherein the step of detecting the placement of the image plane coordination marks relative to each other comprises the step of applying strobed illumination of each form with its associated at least one image coordination mark.

10. A method as claimed in claim 1 wherein the step of detecting the placement of the image plane coordination marks relative to each other further comprises the step of marking documents that are identified as not in synchronization.

11. A method as claimed in claim 1 wherein the step of detecting the placement of the image plane coordination marks relative to each other further comprises the step of forcing a shift in an image plane identified as out of synchronization to put said image plane in synchronization.

12. A method as claimed in claim 1 wherein the plurality of image plane coordination marks are contiguously placed when each of the plurality of image planes are in proper registration, and are not contiguous when any of the plurality of image planes are misregistered.

13. A method as claimed in claim 1 wherein the image plane coordination marks are shifted parallel to direction of motion of the print media past the printhead.

14. A method as claimed in claim 1 wherein the image plane coordination marks are shifted parallel to direction of motion of the print media past the printhead, and the image plane coordination marks are placed between two forms.

15. A method as claimed in claim 1 wherein the image plane coordination marks are shifted perpendicular to direction of motion of the print media past the printhead.

16. A method as claimed in claim 1 further comprising the step of printing a form distinguishing bar code on at least one image plane, to identify defective forms for reprinting or to confirm proper synchronization of all image planes of each document.

17. A method as claimed in claim 1 wherein synchronization errors can be detected when the image plane coordination marks are only printed on alternately printed forms.

18. A method for detecting errors in the synchronization of image planes that make up forms in a print job, the method comprising the steps of:

associating an image plane coordination mark with each of the image planes that make up a form;

forming a composite image group mark for each form, the composite image group mark including a plurality of the image plane coordination marks that do not overlap, each of the plurality of image plane coordination marks of the composite image group mark including a readily detectable relationship with the other of the plurality of image plane coordination marks of the composite image group mark;

differentiating the composite image group mark of one form from the composite image group mark of at least one other form such that the readily detectable relationship between individual of the plurality of image plane coordination marks that make up each composite image group mark is intact if the image planes are properly synchronized and the readily detectable relationship between individual of the plurality of image plane coordination marks is broken if the image planes are not properly synchronized;

detecting whether the readily detectable relationship between the plurality of image plane coordination marks is intact or broken by detecting the absence of an image plane coordination mark from the composite image group mark of one of the forms or by detecting the presence of an image plane coordination mark from the composite image group mark of one of the forms on another form; and providing a synchronization indication of whether the readily detectable relationship is intact or broken.

19. A method as claimed in claim 18 wherein the readily detectable relationship between the plurality of image plane coordination marks comprises a defined spatial relationship between the plurality of image plane coordination marks.

20. A method as claimed in claim 18 wherein the step of differentiating the composite image group mark of one form from the composite image group mark of at least one other form further comprises the step of varying placement of the composite image group mark relative to form origin.

21. A method as claimed in claim 18 wherein the readily detectable relationship between the plurality of image plane coordination marks comprises a readily detectable shape relationship between individual of the plurality of image plane coordination marks.

22. A method as claimed in claim 21 wherein the readily detectable shape relationship between the plurality of image plane coordination marks comprises an identical shape on each of the plurality of image plane coordination marks.

23. A method as claimed in claim 22 wherein the step of differentiating the composite image group mark of one form from the composite image group mark of at least one other form further comprises the step of employing different shapes to differentiate composite image group marks on one form with composite image groups marks on at least one other form.

24. A method as claimed in claim 22 further comprising the step of differentiating the plurality of composite image group marks on a first form with the plurality of composite image group marks on each of two forms printed immediately subsequent to the first form.

25. A method as claimed in claim 18 for detecting that all image planes of a print job are in proper sequence, the method further comprising the steps of: printing a sequence number on a single image plane of an image; assuring synchronicity of each form; detecting the sequence number; and assuring that each detected sequence number is sequential.

26. A method as claimed in claim 18 for detecting that all image planes of a print job are in proper sequence, the method further comprising the steps of: assigning a lookup number to at least one form of a document; printing the assigned lookup number on a single image plane of an image; assuring synchronicity of each form; detecting the lookup number; and assuring that each detected lookup number is in proper sequence.

27. A method for detecting synchronization of printed forms comprising:
  printing a plurality of forms, each of the plurality of forms including a composite image that varies from form to form, the composite image including a plurality of image planes, each image plane including printed data and an image plane coordination mark, the plurality of the image plane coordination marks forming a composite image group mark, each of the plurality of forms including an origin, the origin being a reference point on each form to which each composite image group mark is related, each composite image group mark of each form being offset by a different distance from the origin on the form;
  detecting each of the composite image group marks and identifying placement of the composite image group mark with respect to the origin for each of the plurality of forms;
  detecting movement of one of the plurality of image planes from one composite image on one of the plurality of forms to another composite image on another of the plurality of forms by identifying a misplacement of one of the image plane coordination marks from one of the composite image group marks associated with the one of the plurality of forms; and
  returning a synchronization error after the misplacement is identified.

28. A method as claimed in claim 27, wherein identifying the misplacement of one of the image plane coordination marks from one of the composite image group marks associated with the one of the plurality of forms includes detecting the absence of the image plane coordination mark from the composite image group mark on the one of the plurality of forms.

29. A method as claimed in claim 27, wherein identifying the misplacement of one of the image plane coordination marks from one of the composite image group marks associated with the one of the plurality of forms includes detecting the presence of an image plane coordination mark from the composite image group mark from another form on the one of the plurality of forms.

* * * * *